United States Patent [19]
Wiktor

[11] 4,430,579
[45] Feb. 7, 1984

[54] ELECTRICALLY OPERATED, MECHANICALLY HELD ELECTRICAL SWITCHING DEVICE

[75] Inventor: Dominik M. Wiktor, Cranford, N.J.

[73] Assignee: Automatic Switch Company, Florham Park, N.J.

[21] Appl. No.: 410,804

[22] Filed: Aug. 23, 1982

[51] Int. Cl.³ .............................................. H01H 15/00
[52] U.S. Cl. .................................. 307/134; 307/131 E; 307/116; 307/140; 340/310 CP
[58] Field of Search .................... 307/116, 119, 132 R, 307/132 E, 134, 139, 140, 143, 10 R, 38; 361/208; 340/310 A, 310 CP

[56] References Cited
U.S. PATENT DOCUMENTS 2,860,263 11/1958 Sparrow ............................. 307/140
4,291,236 9/1981 Patton ............................. 307/143 X
4,373,149 2/1983 Coste ............................. 307/10 R X
4,386,338 5/1983 Doyle ....................... 340/310 CP X

FOREIGN PATENT DOCUMENTS 138867 1/1920 United Kingdom ................ 361/208

Primary Examiner—Elliot A. Goldberg
Assistant Examiner—D. Jennings
Attorney, Agent, or Firm—Alan H. Levine

[57] ABSTRACT

An electrical switching device having an actuator reciprocable between two extreme positions, the switch being open and closed, respectively, when the actuator is in its two extreme positions. An electrical operator, such as a solenoid having a movable armature, responds to successive momentary energizations by moving the actuator first to one extreme position and then the other. The actuator is mechanically held in each extreme position by a spring-biased element which also serves to transmit movement of the actuator to the switch contacts. The actuator may have a cam surface shaped to cause opening and closing of the switch contacts, the cam surface also cooperating with the spring-biased element for urging the actuator toward each of its extreme positions. The switching device may be used for interrupting electric power to a customer of a utility by being located between a watt-hour meter and the customer's load, or in other similar applications.

32 Claims, 9 Drawing Figures

TO NON-CONTROLLED LOADS

TO CONTROLLED LOADS

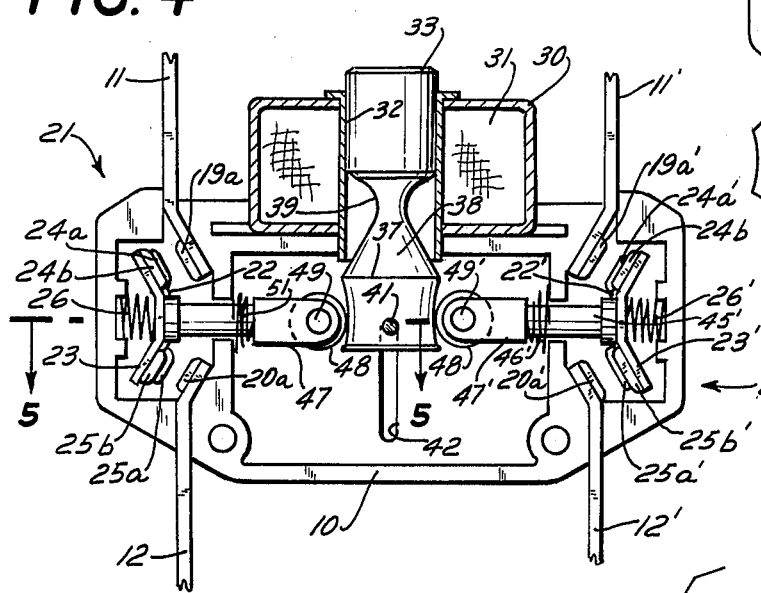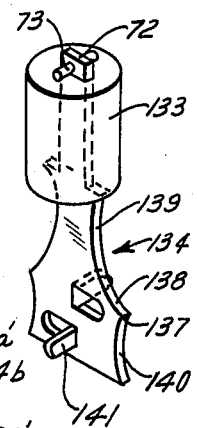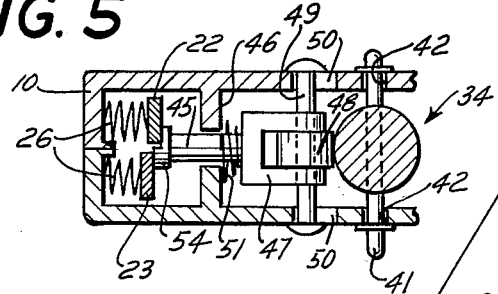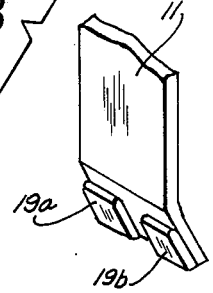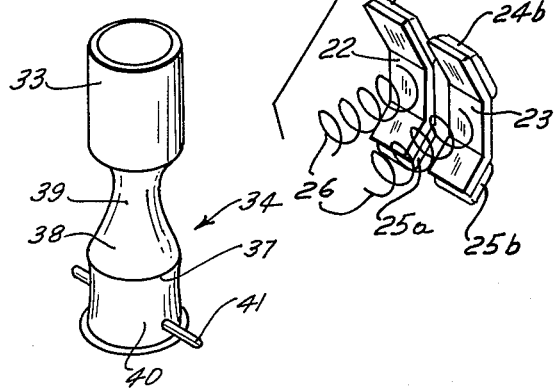

ELECTRICALLY OPERATED, MECHANICALLY HELD ELECTRICAL SWITCHING DEVICE

This invention relates to electrical switching devices capable of being electrically operated by remote control, and more particularly to such devices which respond to successive momentary electrical signals by opening and closing the switch contacts, the switch being held mechanically in each of its open and closed conditions.

It is an object of the present invention to provide such a switching device wherein a single electrical operator, such as an electrical solenoid having a movable armature, responds to successive electrical signals by alternately opening and closing the controls of the switching device.

A switching device of this character finds utility in many environments. An example, used to help illustrate the invention, involves employment of the switching device to disconnect utility power from a customer of the utility in the event that the energy consumption by the customer rises above a predetermined value.

For the purpose of energy management by an electric utility, it has been suggested that customers volunteer to participate in a peak load reduction scheme, in return for a reduction in electric rate charges. Typically, a customer will agree that between certain hours of the day, i.e., those hours during which there is peak demand on the power company's facilities, the customer's load will not rise above some predetermined value. If during these peak hours the customer should begin to draw more than the agreed upon amount of power, he receives a signal, and if within a given time after the signal the load is not reduced, all electrical power to the customer, or power to certain of the customer's applicances, is cut off. The customer can be reconnected, at his option, and if the load has been reduced, e.g., some applicances have been turned off, the power remains on, assuming that the load reduction has been sufficient to lower the amount of power being drawn below the predetermined value.

It is, therefore, another object of the present invention to provide a switching device capable of fitting into a standard watt-hour meter housing, between the meter and the terminals which the meter otherwise engages, so that it may be used as part of an energy management system by an electric utility.

It is still another object of the invention to provide such a switching device which is capable of being operated from a remote location.

It is a further object of the invention to provide such a switching which is electrically operated but held mechanically in both its open and close positions, so that it need be energized only momentarily and does not continuously draw power.

It is yet another object of the invention to provide a switching device wherein the means for transmitting movement of the switch operator to the switch contacts also serve to mechanically hold the switch contacts in each of their open and closed positions.

It is an additional object of the invention to provide a switch actuator cooperable with a pair of movable switch contacts and arranged to move the contacts in sequence so that one opens before the other, the latter thereby serving as an arcing contact to protect the former.

Additional objects and features of the invention will be apparent from the following description in which reference is made to the accompanying drawings:

In the drawings:

FIG. 4 is a view similar to FIG. 2 showing the switching device in open condition;

FIG. 5 is a fragmentary cross-sectional view taken along line 5—5 of FIG. 4;

FIG. 6 is a perspective view of the solenoid armature and switch actuator of FIG. 2;

FIG. 7 is an alternative embodiment of the armature and switch actuator;

FIG. 8 is a fragmentary perspective view of two pairs of stationary and movable contacts of the switching device in open condition.

Figure 1:
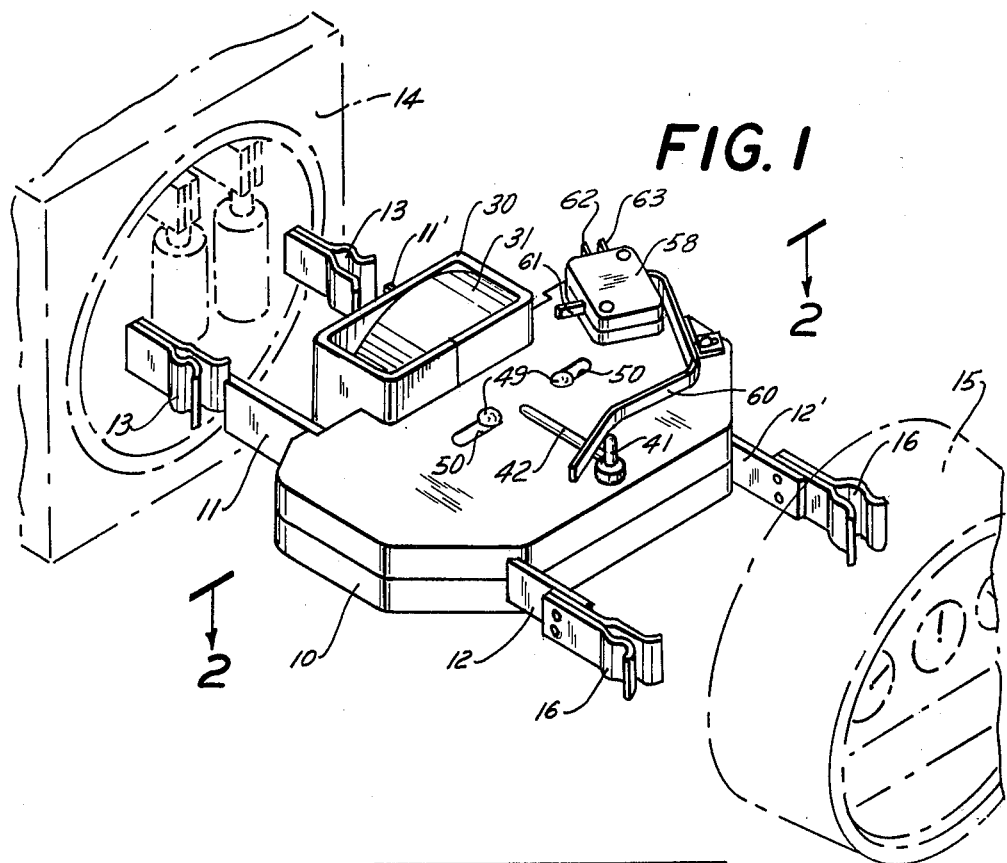
FIG. 1 is an exploded perspective view of a switching device according to the invention located between an electric watt-hour meter and a meter box.

Referring to FIG. 1, the switching device chosen to illustrate the present invention includes a housing 10, of insulator material, having a pair of metal bars 11 and 11' projecting from it in one direction and another pair of metal bars 12 and 12' projecting from it in the opposite direction. Bars 11 and 11' serve as male contacts adapted to electrically engage the usual female contacts 13, within a meter box 14 mounted on the building being supplied with electrical power, which are usually engaged by the male contacts (now shown) of an electric meter 15. Bars 12 and 12' carry springy contact fingers 16 defining female contacts for accommodating the usual male contacts of electric meter 15.

Figure 2:
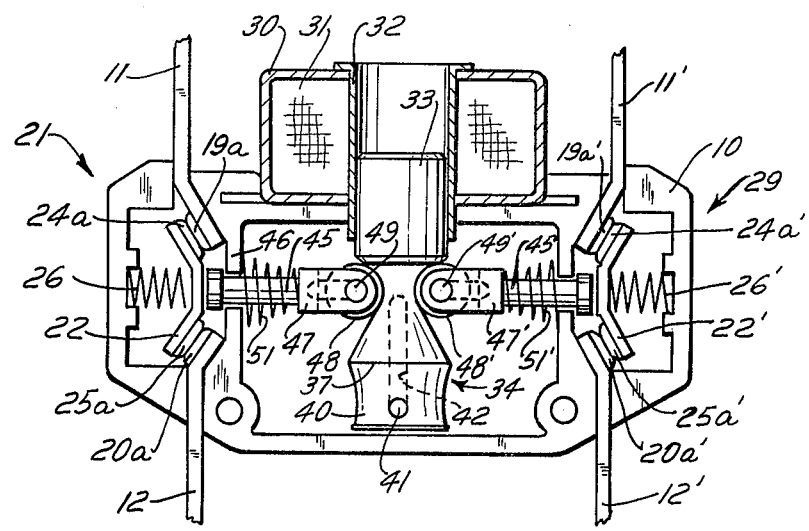
FIG. 2 is a cross-sectional view taken along live 2—2 of FIG. 1, showing the switching device in closed condition.
Figure 3:
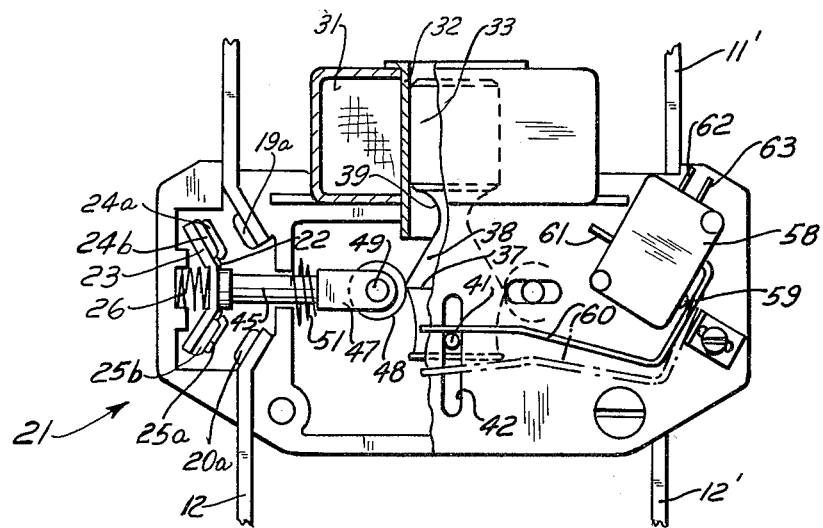
FIG. 3 is a view similar to FIG. 2, but only partially in cross-section, showing the switch actuator moving from one of its two extreme positions to the other.

Bar 11 terminates within housing 10 (see FIGS. 2-4) in a bent portion carrying two stationary contacts 19a and 19b (see also FIG. 8), only contact 19a being visable in FIGS. 2-4. Similarly, bar 12 terminates within housing 10 in a bent portion carrying two stationary contacts 20a and 20b. Contacts 19a and b and 20 a and b constitute the stationary contacts of a switch 21 of the switching device. Switch 21 also includes two movable contact arms 22 and 23, each arm having bent end portions carrying movable contacts. The contacts 24a and 25a carried by movable contact arm 22 are engageable with stationary contacts 19a and 20a, respectively, and the contacts 24b and 25b carried by movable contact arm 23 are engageable with stationary contacts 19b and 20b, respectively.

A compression spring 26, located between each movable contact arm and housing 10, constantly urges contact arms 22 and 23 toward bars 11 and 12 to close switch 21, as shown in FIG. 2. Due to the angled relationship of the ends of bars 11 and 12 and the ends of arms 22 and 23, a wiping action takes place as the movable contacts 24 and 25 engage their respective stationary contacts 19 and 20, and the movable contacts are jammed between the stationary contacts, all of which insures good electrical contact between the movable and stationary contacts.

Housing 10 contains another switch 29 identical to switch 21 described above. Therefore, the parts of switch 20 corresponding to those of switch 21 bear the same reference numerals as their corresponding parts, followed by a prime.

Mounted on housing 10 is a yoke 30 (FIGS. 1-4) of magnetic material within which is an electric solenoid coil 31. Extending along the axis of solenoid 31 is a tube 32, of nonmagnetic material, within which a cylindrical solenoid armature 33 is axially slidable. Solenoid 31 and armature 33 represent an electrical operator for controlling movement of a switch actuator 34 fixed to armature 33.

Actuator 34 (see FIGS. 2-4 and 6) has a generally circular cross-section throughout its length, and a hip 37, of greatest diameter at a point between its ends. A conical portion 38 tapers from hip 37 toward armature 33 and joins a narrow neck 39 which then widens as it merges into armature 33. Actuator 34 also tapers from hip 37 in a direction away from armature 33, but to a lesser degree than the taper of conical portion 38, to define an end portion 40 having a minimum diameter considerably larger than the diameter of neck 39. End portion 40 flares slightly at its free end. The external shape of actuator 34, described above, defines a cam surface, the purpose of which is indicated below.

For guiding the movement of actuator 34, a pin 41 extends through end portion 40, along one of its diameters, the ends of the pin being slidably located within slots 42 in housing 10 (FIGS. 1-5). The slots are arranged parallel to the direction of movement of armature 33 within tube 32.

Linear movement of actuator 34 is transmitted to movable contact arm 22 by an arrangement including a rod 45 (FIGS. 2-5) slidable through a slot in an interior wall 46 within housing 10. At one end, rod 45 carries a yoke 47, between the arms of which a follower roller 48 is mounted for rotation on a pin 49. The ends of pin 49 extend through slots 50 (see FIG. 1) in housing 10 to thereby guide the longitudinal movement of rod 45. Slots 50 are perpendicular to slots 42, whereby rod 45 moves in a direction perpendicular to that of actuator 34. The ends of pin 49 carry enlargements on the exterior of housing 10 to prevent longitudinal movement of the pin. A compression spring 51, seated between wall 46 and yoke 47, and surrounding rod 45, constantly urges rod 45 toward actuator 34, thereby maintaining contact between follower roller 48 and the cam surface of actuator 34. Springs 26 also aid this action.

The end of rod 45 opposite roller 48 carries an element 54 (FIG. 5) having a stepped configuration defining two surfaces 55 and 56 (FIG. 8) located in two different parallel planes. Movable contact arm 22 is in the path of movement of surface 55 and movable contact arm 23 is in the path of movement of surface 56. When switch 21 is closed, as shown in FIG. 2, element 54 is spaced from both contact arms 22 and 23. As rod 45 moves toward the left, surface 56 engages contact arm 23 before surface 55 engages contact arm 22 (FIG. 5) thereby moving arm 23 away from bars 11 and 12 before arm 22 is moved. As a result, contacts 24b and 25b separate from contacts 19b and 20b, respectively, before contacts 24a and 25a separate from contacts 19a and 20a, respectively. This sequential operation causes contact pairs 19a, 24a and 20a, 25a to serve as arcing contacts which prolong the life of contact pairs 19b, 24b and 20b, 25b, and hence prolong the useful life of the switch 21.

The arrangement for transmitting motion from actuator 34 to movable contact arm 23 is identical to that described above. Therefore, the parts of that transmission corresponding to those of the transmission already described bear the same reference numerals as their corresponding parts, followed by a prime.

Figure 9:
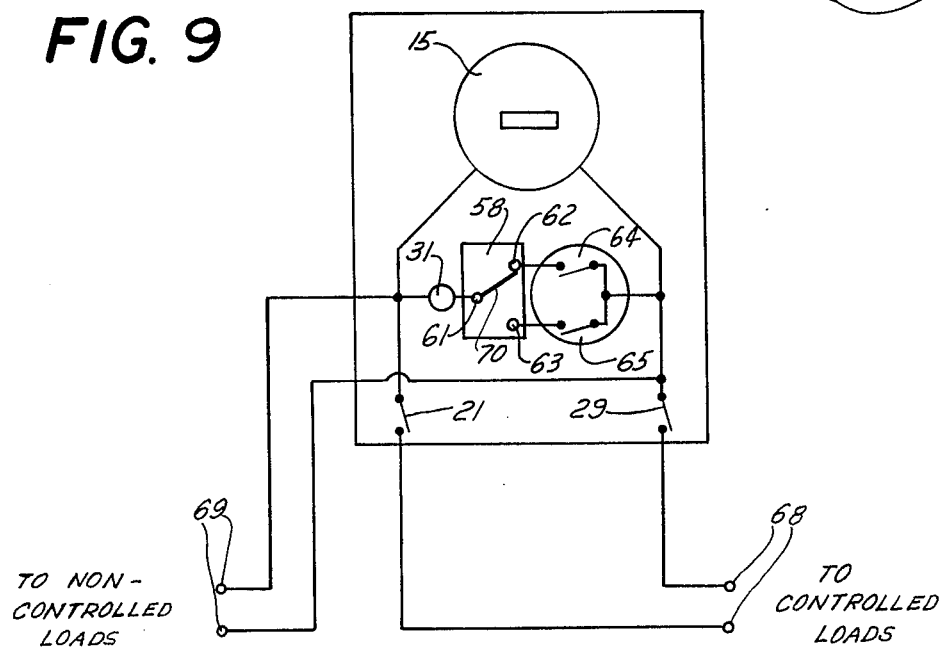
FIG. 9 is a schematic diagram showing the switching device in a power-interrupting circuit.

Mounted on the outside of housing 10 is an auxiliary switch in the form of a single pole, double throw microswitch 58 having an actuator button 59 (FIG. 3) controlled by an actuator arm 60 (FIG. 1). The free end of arm 60 is located in the path of movement of one end of pin 41, carried by actuator 34. Microswitch 58 has three terminals 61, 62, and 63. Terminal 61 is connected to solenoid 31 (FIG. 9), the other side of the solenoid being connected to incoming power at meter 15. Terminals 62 and 63 are connected to one side of switches 64 and 65 which can be controlled from a remote location. The other sides of switches 64 and 65 are connected to the utility source at meter 15. With further reference to FIG. 9, those loads of a customer which are to be controlled by the utility for energy management purposes are connected to terminals 68 and hence to utility power at meter 15 through switches 21 and 29 of the present switching device. Those more essential loads, which are not to be controlled by the utility, are connected to terminals 69 and hence directly to utility power at meter 15.

The operation of the switching device of the present invention will now be described. Assume that switches 21 and 29 are closed, as shown in FIG. 2, and microswitch 58 is in the condition illustrated in FIG. 9. All loads are, therefore, receiving power. Suppose now that the controlled loads connected to terminals 68 are to be disconnected from meter 15 and hence from utility power. The utility will send a signal causing switch 64 (FIG. 9) to close, as a result of which solenoid 31 is energized. In response to energization of solenoid 31, armature 33 moves from the position shown in FIG. 2, wherein it is partially out of the solenoid, to a position in which it is centered within the solenoid (FIG. 3), since the magnetic flux created when the solenoid is energized always tends to center the armature within the solenoid. Actuator 34 partakes of the movement of armature 33, since the parts are fixed to each other. During this movement, the conical portion 38 of the actuator, along which follower rollers 48, 48' roll, causes rods 45, 45' to move away from each other against the force of springs 51, 51'. Movement of rods 45, 45' is transmitted to movable contact arms 22, 23 and 22', 23' causing the latter to move away from bars 11, 12 and 11', 12', respectively (FIG. 3), against the force of springs 26, 26', thereby opening switches 21 and 29. Consequently, the controlled loads connected to terminals 68 are cut off from utility power. The non-controlled loads connected to terminals 69 are, however, not affected.

It will be seen in FIG. 3 that when armature 33 reaches its centered position within solenoid 31, follower rollers engage with the hip 37, i.e., the largest diameter portion of actuator 34. Springs 51, 51' and 26, 26' are therefore compressed to their maximum extent. At the same time, pin 41 has engaged actuator arm 60 and moved the latter from its broken line position in FIG. 3 to its solid line position. In this latter position, arm 60 operates button 59 and shifts the movable contact 70 (FIG. 9) of microswitch 58 away from terminal 62 and into engagement with terminal 63. Since remotely controlled switch 65 is open, solenoid 31 is deenergized.

Despite deenergization of solenoid 31, armature 33 continues to move (upwardly in FIG. 3) past its centered position within the solenoid, due to inertia. Once armature 33 moves past its centered position, hip 37 of actuator 34 moves past rollers 48. At this point, the combination of inertia and the force of springs 51, 51' and 26, 26' pushing rollers 48 against the tapered surface of end portion 40 of the actuator moves armature 33 and actuator 34 to the position shown in FIG. 4. Movement past this position is prevented by pin 41 reaching the ends of slots 42 and by the flared end of portion 40. Rollers 48, 48' are seated at the point of minimum diameter of end portion 40, but this diameter is nevertheless large enough to keep rods 45, 45' in a position wherein contact arms 22, 23 and 22', 23' are held spaced from stationary contacts 19 and 20 to maintain switches 21 and 29 open.

It will be appreciated that rods 45, 45' and hence rollers 48, 48' being spring pressed against the surface of end portion 40 serve to mechanically hold actuator 34 and armature 33 in their FIG. 4 positions. Furthermore, solenoid 31 was energized only momentarily, i.e., long enough to move armature 33 from its FIG. 2 position to its FIG. 3 position, and the duration of energization of solenoid 31 is independent of the length of time during which switch 64 is closed, since the solenoid is deenergized upon snap over of microswitch 58.

When the controlled loads connected to terminals 68 are to be reconnected to utility power, remotely controlled switch 65 (FIG. 9) is closed. Since movable contact 70 of microswitch 58 is in contact with terminal 63, solenoid 31 is again energized. This causes armature 33 to move toward a position centered within solenoid 31, i.e., from its FIG. 4 position to its FIG. 3 position. Upon reaching the position shown in FIG. 3, or slightly past that position, actuator arm 60 releases push button 59 and the movable arm 70 of microswitch 58 snaps back into engagement with terminal 62. Since remotely controlled switch 64 has previously been opened, solenoid 31 is deenergized. A combination of inertia and the spring force of rollers 48, 48' on the tapered surface of conical portion 38 continues movement of armature 33 and actuator 34 past the centered position of the armature in the solenoid until the parts reach the position shown in FIG. 2. In this position, switches 21 and 29 are again closed, and the controlled loads are connected to the utility source at meter 15.

The movement of armature 33 and actuator 34 terminates when neck 39 of the actuator reaches a position between rollers 48 and 48'. At this point pin 41 reaches the end of slots 42. Due to the small diameter of neck 39, rods 45 and 45' are permitted to move close enough to each other to permit the contacts carried by movable contact arms 22, 23, and 22' and 23' to engage their respective stationary contacts carried by bars 11, 12 and 11', 12'. Rods 45, 45' and hence rollers 48, 48' being spring pressed against the surface of neck 39 serve to mechanically hold actuator 34 and armature 33 in their FIG. 2 positions. It will be appreciated, therefore, that rods 45, 45', and their associated elements, serve both to transmit the motion of actuator 34 to movable contact arms 22, 23 and 22', 23' and also to mechanically hold the actuator in each of its two extreme positions illustrated in FIGS. 2 and 4, respectively. Furthermore, once again solenoid 31 has only been energized momentarily, i.e., long enough to move armature 33 from its FIG. 4 position to its FIG. 3 position, and the duration of energization of solenoid 31 is independent of the length of time during which switch 65 is closed, since the solenoid is deenergized upon snap over of microswitch 58.

Thus, each successive momentary energization of solenoid 31 causes armature 33, and hence actuator 34, to move in the direction opposite to the direction in which they moved as a result of the immediately previous energization thereby successively opening and closing switches 21 and 29. While in the present example actuator 34 has been used to control switches 21 and 29, it could be used in other environments. For example, the lower end of actuator 34 could carry a resilient valve disk movable toward and away from a valve seat in a valve which would be mechanically held in each of its open and closed conditions.

The armature 33 and actuator 34 described above, and shown in detail in FIG. 6, is conveniently formed of a single piece of material, which is necessarily a magnetic material since armature 33 must be formed of a magnetic material. An alternative embodiment is illustrated in FIG. 7, wherein armature 133 is a cylindrical element having an axial slot. Actuator 134 is a flat plate, which may be a metal stamping. The edges of the plate are formed with cam surfaces similar to that of actuator 34, namely, a neck 139, a trianglar (rather than conical) portion 138, a hip 137, and an end portion 140 having a flared end. Rollers 48 and 48' would be arranged to engage these edges of actuator 134. Two tabs 141 are stuck out the plate for engagement within slots 42 in the housing 10. A tongue 72 projecting from one end of the actuator plate extends through the axial slot in armature 133 and the two parts are joined by a cross pin 73 fitting through a hole in the end of tongue 72 which projects beyond the armature.

The armature and actuator combination of FIG. 7 is cheaper to manufacture than that of FIG. 6. In addition, since actuator 134 has less mass than actuator 34, there is less magnetic flux leakage through actuator 134 when solenoid 31 is energized while the parts are in their FIG. 4 position.

It may be mentioned that actuator 34 could be replaced by another type of toggle mechanism. Two rigid links could be provided, each pivoted at one end to pin 41. The other end of one of the links would be pivoted to pin 49 and the other end of the other link would be pivoted to pin 49' (rollers 48 and 48' would be eliminated). A rod would extend from armature 33 to pin 41, to cause the latter to move with the armature. Slots 42 would be extended slightly to a point above the line defining the longitudinal axes of rods 45 and 45'.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. An electrical switching device comprising:
   (a) switch means having an open position and a closed position,
   (b) actuator means reciprocable between two extreme positions, the switch means being open when the actuator means is in one of its extreme positions and the switch means being closed when the actuator means is in the other of its extreme positions,
   (c) an electrical operator for controlling movement of the actuator means, the operator being a single electrical solenoid and a single armature movable within the solenoid, (d) means for momentarily energizing the operator to move the actuator means from each of its extreme positions to the other, each successive momentary energization of the operator causing movement of the actuator means in a direction opposite to that of its immediately preceding movement, and (e) means for mechanically holding the actuator means in each of its extreme positions after termination of the momentary energization of the operator which caused the actuator means to reach that position.

2. An electrical switching device as defined in claim 1 wherein the armature is movable between two extreme positions, one position being to one side of the position in which the armature is centered within the solenoid and the other position being to the other side of the centered position.

3. An electrical switching device as defined in claim 2 wherein the means for momentarily energizing the operator includes an electrical circuit for energizing the solenoid, the circuit including an auxiliary switch for deenergizing the circuit during movement of the armature from each of its extreme positions to the other.

4. An electrical switching device as defined in claim 3 wherein the auxiliary switch has an actuator operable in response to movement of the actuator means from each of its extreme positions to the other.

5. An electrical switching device as defined in claim 1 including means for transmitting movement of the actuator means to the switch means, the transmitting means also serving as the means for mechanically holding the actuator means in each of its extreme positions.

6. An electrical switching device as defined in claim 1 wherein the switching device is for interrupting electric power to the customer of a utility, and including means for connecting the switching device between a watt-hour meter and the customer's load.

7. An electrical control device comprising:
(a) actuator means reciprocable between two extreme positions,
(b) an electrical operator for controlling movement of the actuator means, the operator being a single electrical solenoid and a single armature movable within the solenoid,
(c) means for momentarily energizing the operator to move the actuator means from each of its extreme positions to the other, each successive momentary energization of the operator causing movement of the actuator means in a direction opposite to that of its immediately preceding movement, and
(d) means for mechanically holding the actuator means in each of its extreme positions after termination of the momentary energization of the operator which caused the actuator means to reach that position.

8. An electrical control device as defined in claim 7 wherein the armature is movable between two extreme positions, one position being to one side of the position in which the armature is centered within the solenoid and the other position being to the other side of the centered position.

9. An electrical switching device comprising:
(a) switch means having an open position and a closed position,
(b) actuator means reciprocable between two extreme positions, the switch means being open when the actuator means is in one of its extreme positions and the switch means being closed when the actuator means is in the other of its extreme positions, and the actuator means moving through an intermediate unstable position as it moves from each of its extreme positions toward the other,
(c) an electrical operator for controlling movement of the actuator means,
(d) means for momentarily energizing the operator to move the actuator means from each of its extreme positions to the other, each successive momentary energization of the operator causing movement of the actuator means in a direction opposite to that of its immediately preceding movement, and
(e) means for mechanically holding the actuator means in each of its extreme positions after termination of the momentary energization of the operator which caused the actuator means to reach that position, the mechanical holding means including spring means stressed to a maximum extent when the actuator means is in its intermediate position, the spring means urging the actuator means toward the extreme position of the latter to which the actuator means is moving after the actuator means passes through its intermediate position.

10. An electrical switching device as defined in claim 9 wherein the operator is a single electrical solenoid and an armature movable within the solenoid, the armature being connected to the actuator means and movable between two extreme positions, one position being to one side of the position in which the armature is centered within the solenoid and the other position being to the other side of the centered position, and the armature moving through its centered position at substantially the same time that the actuator means moves through its intermediate position.

11. An electrical switching device as defined in claim 10 wherein the means for momentarily energizing the operator includes an electrical circuit for energizing the solenoid, the circuit including an auxiliary switch for deenergizing the circuit at about the time that the armature moves through its centered position and hence at about the time that the actuator moves through its intermediate position.

12. An electrical switching device comprising:
(a) switch means having an open position and a closed position,
(b) actuator means reciprocable between two extreme positions, the switch means being open when the actuator means is in one of its extreme positions and the switch means being closed when the actuator means is in the other of its extreme positions, the actuator means having a cam surface defining two ramp portions inclined toward each other and away from the axis of movement of the actuator means, the ramp portions merging at a point spaced a maximum distance from the axis of movement of the actuator means, and including means for transmitting movement of the actuator means to the switch means, the transmitting means including follower means engaging the cam surface,
(c) an electrical operator for controlling movement of the actuator means,
(d) means for momentarily energizing the operator to move the actuator means from each of its extreme positions to the other, each successive momentary energization of the operator causing movement of the actuator means in a direction opposite to that of its immediately preceding movement, and (e) means for mechanically holding the actuator means in each of its extreme positions after termination of the momentary energization of the operator which caused the actuator means to reach that position.

13. An electrical switching device as defined in claim 12 including means for guiding the movement of the actuator means along a straight line path of movement.

14. An electrical switching device as defined in claim 13 wherein the guide means includes a pin slidable within an elongated slot, one of the pin and slot being carried by the actuator means and the other of the pin and slot being fixed with respect to the stationary part of the switch means.

15. An electrical switching device as defined in claim 12 wherein the follower means is spring biased toward the cam surface, the spring being stressed to its maximum extent when the follower means engages the point of the cam surface spaced farthest from the axis of movement of the actuator means, and the spring urging the actuator to each of its extreme positions when the follower means engages one or the other of the ramp portions, respectively.

16. An electrical switching device as defined in claim 15 wherein the means for momentarily energizing the operator includes an electrical circuit including an auxiliary switch for deenergizing the circuit at about the time, during movement of the actuator means, that the follower means engages the point of the cam surface spaced farthest from the axis of movement of the actuator means.

17. An electrical switching device as defined in claim 16 wherein the operator is a single electrical solenoid and an armature movable within the solenoid, the armature being connected to the actuator means and movable between two extreme positions, one position being to one side of the position in which the armature is centered within the solenoid and the other position being to the other side of the centered position, the armature moving through its centered position at about the same time as the follower means engages the point of the cam surface spaced farthest from the axis of movement of the actuator means.

18. An electrical switching device as defined in claim 17 wherein the solenoid armature and the actuator means are formed as a single piece of magnetic material having a generally circular cross-section throughout its length, the outer contour of the activator means defining the cam surface.

19. An electrical switching device as defined in claim 17 wherein the solenoid armature is a generally cylindrical element and the actuator means is a flat plate joined to the armature, at least one side edge of the plate being formed with the cam surface.

20. An electrical switching device comprising:

(a) switch means having an open position and a closed position, the switch means including two parallel stationary contact means and two parallel movable contact means cooperable with the stationary contact means, respectively, (b) actuator means reciprocable between two extreme positions, the switch means being open when the actuator means is in one of its extreme positions and the switch means being closed when the actuator means is in the other of its extreme positions, (c) an electrical operator for controlling movement of the actuator means, (d) means for momentarily energizing the operator to move the actuator means from each of its extreme positions to the other, each successive momentary energization of the operator causing movement of the actuator means in a direction opposite to that of its immediately preceding movement, (d) means for mechanically holding the actuator means in each of its extreme positions after termination of the momentary energization of the operator which caused the actuator means to reach that position, and (f) means for transmitting movement of the actuator means to the switch means, the transmitting means including means for moving one of the movable contact means out of engagement with its respective stationary contact means before the other movable contact means is moved out of engagement with its respective stationary contact means.

21. An electrical switching device as defined in claim 20 wherein said moving means is an element having a stepped configuration defining two surfaces located in different parallel planes, one of the movable contact means being in the path of movement of one of the surfaces and the other movable contact means being in the path of movement of the other surface.

22. An electrical control device comprising:

(a) actuator means reciprocable between two extreme positions, the actuator means moving through an intermediate unstable position as it moves from each of its extreme positions toward the other, (b) an electrical operator for controlling movement of the actuator means, (c) means for momentarily energizing the operator to move the actuator means from each of its extreme positions to the other, each successive momentary energization of the operator causing movement of the actuator means in a direction opposite to that of its immediately preceding movement, and (d) means for mechanically holding the actuator means in each of its extreme positions after termination of the momentary energization of the operator which caused the actuator means to reach that position, the mechanical holding means including spring means stressed to a maximum extent when the actuator means is in its intermediate position, the spring means urging the actuator means toward the extreme position of the latter to which the actuator means is moving after the actuator means passes through its intermediate position.

23. An electrical control device as defined in claim 22 wherein the operator is a single electrical solenoid and an armature movable within the solenoid, the armature being connected to the actuator means and movable between two extreme positions, one position being to one side of the position in which the armature is centered within the solenoid and the other position being to the other side of the centered position, and the armature moving through its centered position at substantially the same time the actuator means moves through its intermediate position.

24. An electrical control device as defined in claim 23 wherein the means for momentarily energizing the operator includes an electrical circuit for energizing the solenoid, the circuit including an auxiliary switch for deenergizing the circuit at about the time that the armature moves through its centered position and hence at about the time that the actuator moves through its intermediate position.

25. An electrical control device comprising:
  (a) actuator means reciprocable between two extreme positions, the actuator means having a cam surface defining two ramp portions inclined toward each other and away from the axis of movement of the actuator means, the ramp portions merging at a point spaced a maximum distance from the axis of movement of the actuator means,
  (b) an electrical operator for controlling movement of the actuator means,
  (c) means for momentarily energizing the operator to move the actuator means from each of its extreme positions to the other, each successive momentary energization of the operator causing movement of the actuator means in a direction opposite to that of its immediately preceding movement, and
  (d) means for mechanically holding the actuator means in each of its extreme positions after termination of the momentary energization of the operator which caused the actuator means to reach that position, the mechanical holding means including follower means engaging the cam surface.

26. An electrical control device as defined in claim 25 including means for guiding the movement of the actuator means along a straight line path of movement.

27. An electrical control device as defined in claim 26 wherein the guide means includes a pin slidable within an elongated slot, one of the pin and slot being carried by the actuator means and the other of the pin and slot being fixed with respect to the stationary part of the switch means.

28. An electrical control device as defined in claim 25 wherein the follower means is spring biased toward the cam surface, the spring being stressed to its maximum extent when the follower means engages the point of the cam surface spaced farthest from the axis of movement of the actuator means, and the spring urging the actuator to each of its extreme positions when the follower means engages one or the other of the ramp portions, respectively.

29. An electrical control device as defined in claim 28 wherein the means for momentarily energizing the operator includes an electrical circuit including an auxiliary switch for deenergizing the circuit at about the time, during movement of the actuator means, that the follower means engages the point of the cam surface spaced farthest from the axis of movement of the actuator means.

30. An electrical control device as defined in claim 29 wherein the operator is a single electrical solenoid and an armature movable within the solenoid, the armature being connected to the actuator means and movable between two extreme positions, one position being to one side of the position in which the armature is centered within the solenoid and the other position being to the other side of the centered position, the armature moving through its centered position at about the same time as the follower means engages the point of the cam surface spaced farthest from the axis of movement of the actuator means.

31. An electrical control device as defined in claim 30 wherein the solenoid armature and the actuator means are formed as a single piece of magnetic material having a generally circular cross-section throughout its length, the outer contour of the activator means defining the cam surface.

32. An electrical control device as defined in claim 30 wherein the solenoid armature is a generally cylindrical element and the actuator means is a flat plate joined to the armature, at least one side edge of the plate being formed with the cam surface.

* * * * *